(12) United States Patent
Leonard et al.

(10) Patent No.: US 10,946,985 B2
(45) Date of Patent: Mar. 16, 2021

(54) CRADLE ASSEMBLY FOR SUPPORTING A DOOR OF AN AIRCRAFT TO FACILITATE SERVICING THE DOOR, AND ARRANGEMENTS AND METHODS FOR THE SAME

(71) Applicant: Gulfstream Aerospace Corporation, Savannah, GA (US)

(72) Inventors: Patrick Leonard, Savannah, GA (US); Derek Shearouse, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 73 days.

(21) Appl. No.: 15/985,566

(22) Filed: May 21, 2018

(65) Prior Publication Data

US 2019/0352020 A1 Nov. 21, 2019

(51) Int. Cl.
*B62B 3/06* (2006.01)
*B64F 5/50* (2017.01)
*B62B 3/10* (2006.01)

(52) U.S. Cl.
CPC .............. *B64F 5/50* (2017.01); *B62B 3/0625* (2013.01); *B62B 3/108* (2013.01); *B62B 2202/90* (2013.01); *B62B 2203/10* (2013.01); *B62B 2203/74* (2013.01)

(58) Field of Classification Search
CPC ................ B62B 3/02; B62B 3/04; B62B 3/08
USPC ............. 280/33.996; 248/129, 139, 130, 143
See application file for complete search history.

(56) References Cited

U.S. PATENT DOCUMENTS

| | | | | |
|---|---|---|---|---|
| 5,899,297 A * | 5/1999 | Clark | ........................ | B25H 5/00 182/222 |
| 6,170,855 B1 * | 1/2001 | Bianchetto | .............. | B62B 3/104 280/47.315 |
| 6,880,838 B2 * | 4/2005 | Hjorth | ....................... | B62B 3/08 280/33.996 |
| 7,007,790 B2 * | 3/2006 | Brannon | ................ | B65G 69/22 198/346 |
| 7,097,406 B1 * | 8/2006 | Gang | .................... | B60B 29/002 254/105 |
| 7,497,448 B2 * | 3/2009 | Brown | ...................... | B62B 3/08 280/47.34 |
| 8,353,524 B2 * | 1/2013 | Gonzalez | .................. | B62B 3/02 280/47.19 |
| 9,004,509 B2 * | 4/2015 | Smith | ..................... | B62B 3/108 280/79.7 |
| 9,126,611 B2 * | 9/2015 | Liu | ......................... | B62B 5/067 |
| 9,573,420 B2 * | 2/2017 | Hedley | .................. | B66F 9/065 |
| 9,592,845 B2 * | 3/2017 | Palma | ....................... | B62B 3/04 |
| 9,970,195 B1 * | 5/2018 | Vasquez | .................. | E04D 15/06 |
| 10,029,270 B2 * | 7/2018 | Noel | .................... | B05B 13/0285 |
| 10,035,531 B2 * | 7/2018 | McVay | .................... | B62B 3/10 |
| 10,336,357 B2 * | 7/2019 | Meier | ..................... | A22B 7/006 |
| 2007/0007390 A1 | 1/2007 | Doerer | | |

\* cited by examiner

*Primary Examiner* — Jeffrey J Restifo
(74) *Attorney, Agent, or Firm* — LKGlobal | Lorenz & Kopf, LLP

(57) ABSTRACT

Cradle assemblies for supporting a door of an aircraft to facilitate servicing the door, and arrangements and methods for the same are provided. In one example, a cradle assembly includes a base and a cradle support subassembly pivotably coupled to the base. The cradle support subassembly is configured to support an outer section of the door.

14 Claims, 5 Drawing Sheets

CRADLE ASSEMBLY FOR SUPPORTING A DOOR OF AN AIRCRAFT TO FACILITATE SERVICING THE DOOR, AND ARRANGEMENTS AND METHODS FOR THE SAME

TECHNICAL FIELD

The technical field relates generally to servicing doors of aircrafts, and more particularly, relates to cradle assemblies for supporting a door of an aircraft for servicing the door, for example, while the door is attached to the aircraft's fuselage, and arrangements and methods for the same.

BACKGROUND

In the aircraft industry, many structural components require service maintenance during the life of an aircraft. Aircraft doors are no different. For example, a passenger aircraft door is a relatively complicated assembly that includes various components such as an outer skin supported by an underlying structure, various hydraulics and electrical components that are embedded within the door's structure, and stairs on an opposite side of the outer skin for passenger ingress and egress. Additionally, the aircraft door may include various seals, hinges, latches, releases, handles and other like components.

Typically, one or more components of an aircraft door will require servicing at various times during the life of the aircraft. This may require partially disassembling portions of the door such as the stairs to gain access to various underlying components, for example, hydraulics, electrical components, and/or the like, performing the necessary service maintenance, and reassembling the door. Often, it is also desirable to perform such maintenance while the door is still attached to the aircraft's fuselage to avoid uninstalling and reinstalling the door to the fuselage. This however may require, for example, that the door be positioned in a partially open or intermediate position between a fully closed position and a fully open position to facilitate servicing the door. Unfortunately, although aircraft doors are designed to move smoothly and efficiently between a fully closed and a fully open position, many aircraft doors are not configured to be sufficiently stable when statically suspended at a partially open or intermediate position to allow service maintenance work to be performed on the door.

Accordingly, it is desirable to provide an apparatus for supporting a door of an aircraft to facilitate servicing the door and a method for the same. Furthermore, other desirable features and characteristics of the various embodiments described herein will become apparent from the subsequent detailed description and the appended claims, taken in conjunction with the accompanying drawings and this background.

SUMMARY

Cradle assemblies for supporting a door of an aircraft to facilitate servicing the door, and arrangements and methods for the same, are provided herein. In an exemplary embodiment, a cradle assembly for supporting a door of an aircraft includes a base and a cradle support subassembly pivotably coupled to the base. The cradle support subassembly is configured to support an outer section of the door.

In another exemplary embodiment, a cradle assembly and lift arrangement for supporting a door of an aircraft includes a lift that includes a table and that is configured to vertically move the table. A base is mounted on the table of the lift. A cradle support subassembly is pivotably coupled to the base and is configured to support an outer section of the door.

In accordance with an exemplary embodiment, a method for supporting a door of an aircraft to facilitate servicing the door is provided. The method includes supporting a base of a cradle assembly on a table of a lift. An outer section of the door in a first position is contacted with a cradle support subassembly of the cradle assembly. The table of the lift is moved to advance the cradle assembly and the door to a second position. The door is supported with the cradle support subassembly pivoting relative to the base.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to cradle assemblies for supporting a door of an aircraft to facilitate servicing the door, and arrangements and methods for the same. The exemplary embodiments taught herein provide a cradle assembly for supporting a door of an aircraft. The cradle assembly includes a base and a cradle support subassembly pivotably coupled to the base. In an exemplary embodiment, the cradle assembly may form part of an arrangement with a lift that includes a table configured to be moved vertically. The base of the cradle assembly is mounted on the table of the lift so that the cradle assembly can be moved together with the table by the lift.

The cradle support subassembly is configured to receive and support the door of the aircraft at various partially open or intermediate positions, for example, while the door is attached to the fuselage of the aircraft. In one example, an outer section(s) of a substantially open door is contacted with, received by, or otherwise "scooped up" into the cradle support subassembly of the cradle assembly. The table of the lift is moved vertically to advance the door, which is supported by cradle assembly, to a partially open or intermediate position. In an exemplary embodiment, while the door is being moved, the door rotates about its attachment points to the fuselage of the aircraft and the cradle support subassembly pivots relative to the base to ensure that the outer sections of the door are supported by the cradle support subassembly during movement of the door. Further, when the door comes to rest and is statically held in the partially open or intermediate position, the door is supported by the cradle assembly, which is supported by the lift, so that the door is sufficiently stable to allow the door to be serviced (e.g., maintenance of one or more of the door's components).

Figure 1:
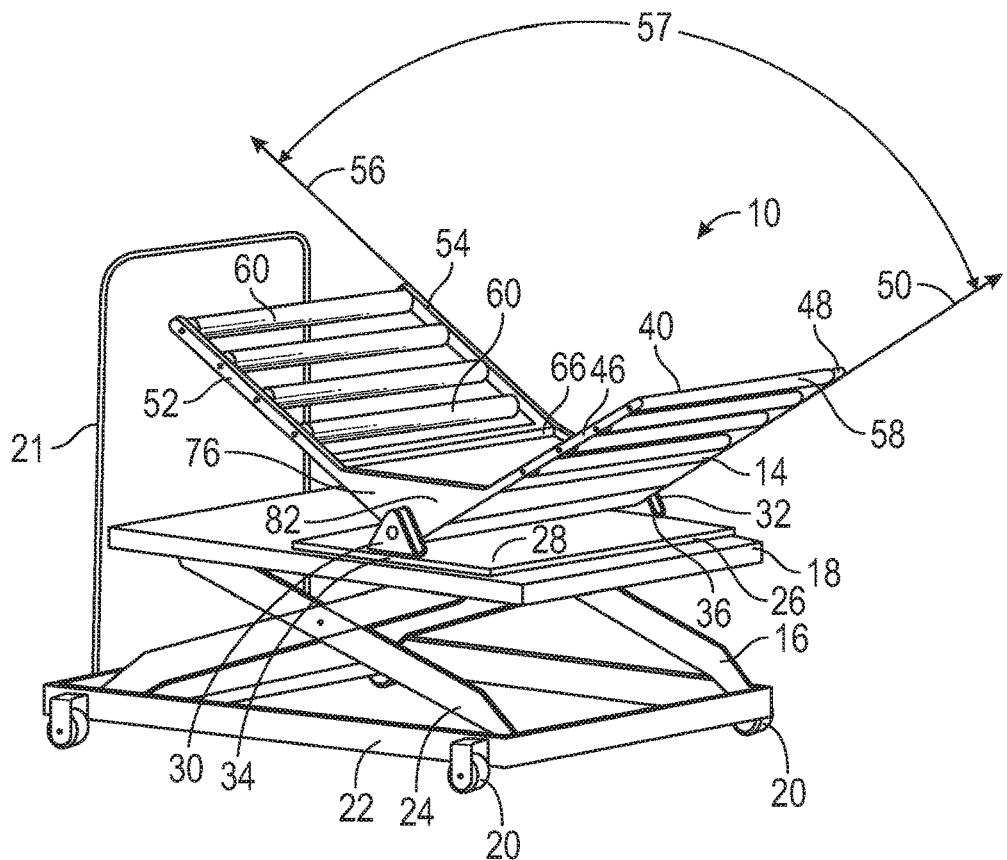
FIG. 1 illustrates a perspective view of a cradle assembly and lift arrangement in accordance with an exemplary embodiment.
Figure 2:
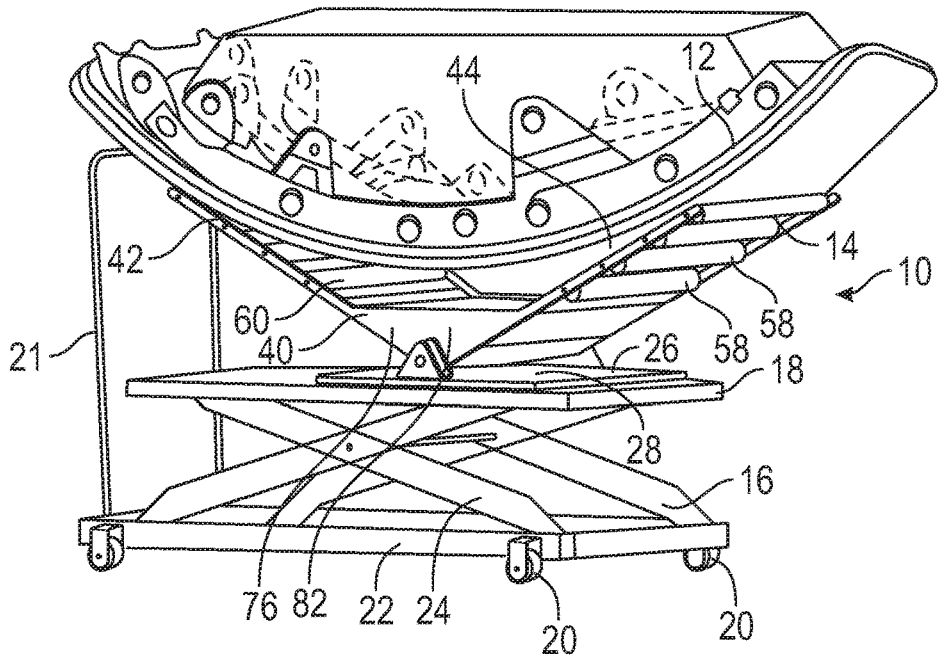
FIG. 2 illustrates a perspective view of a cradle assembly and lift arrangement including a door that is supported in the cradle assembly in accordance with an exemplary embodiment.
Figure 3:
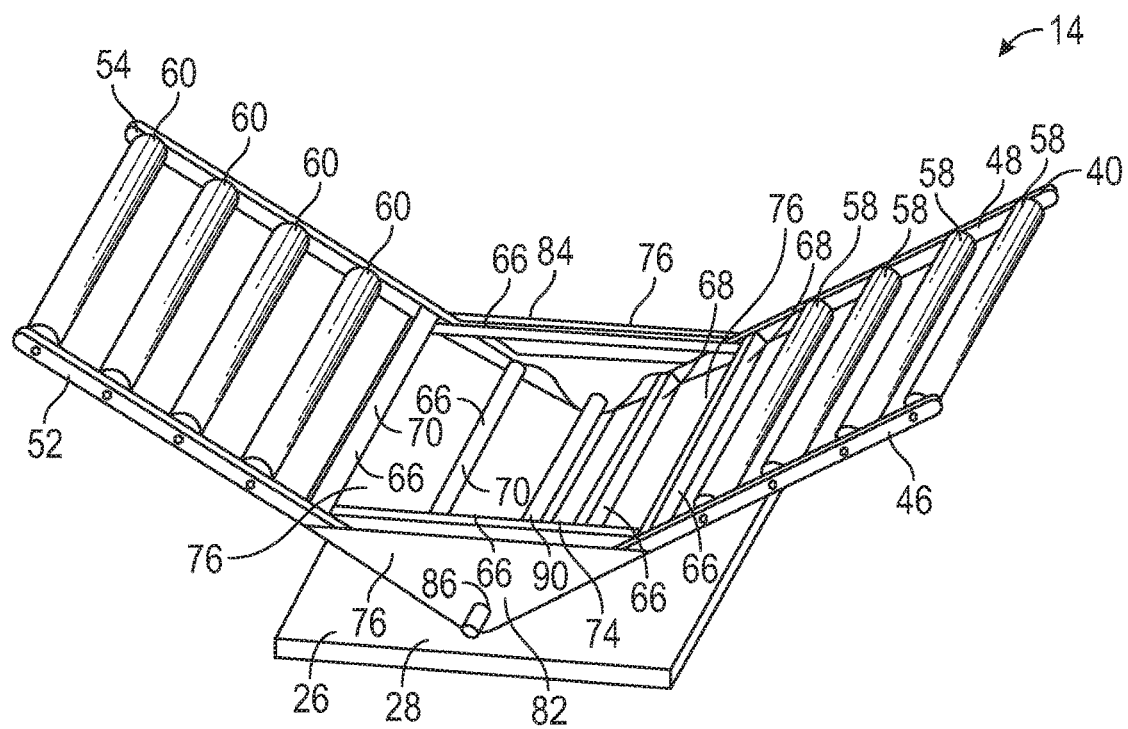
FIG. 3 illustrates a perspective view of a cradle assembly in accordance with an exemplary embodiment.
Figure 4:
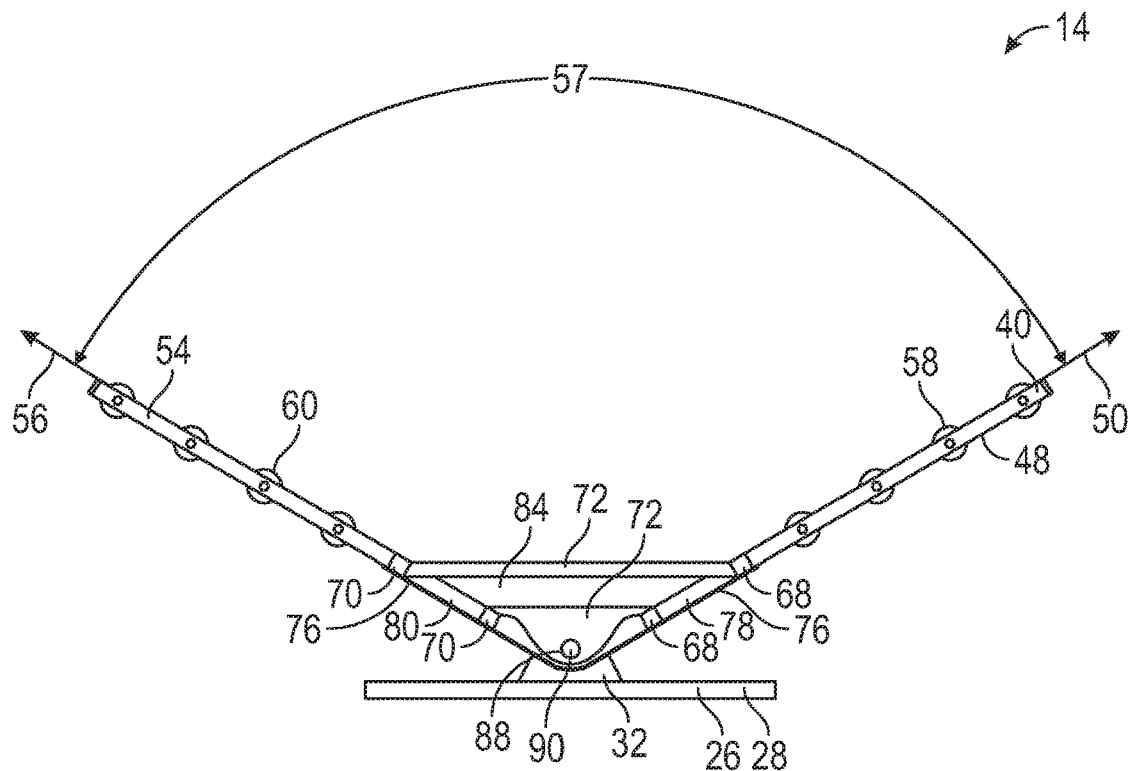
FIG. 4 is a side sectional view of a cradle assembly in accordance with an exemplary embodiment.

FIG. 1 illustrates a perspective view of a cradle assembly and lift arrangement 10 in accordance with an exemplary embodiment. FIG. 2 illustrates a perspective view of the cradle assembly and lift arrangement 10 including a door 12 of an aircraft in accordance with an exemplary embodiment. The cradle assembly and lift arrangement 10 includes a cradle assembly 14 for supporting the door 12, and a lift 16 that supports the cradle assembly 14.

The lift 16 includes a table 18 and is configured to move the table 18 vertically upward and/or downward. The lift 16 may also includes wheels 20 that are attached to a base frame 22 of the lift 16 to allow the lift 16 to be moved along the floor, platform, or other relatively horizontal or sloped surface by applying manual force, for example, to a handle 21 that is coupled to the base frame 22. As illustrated, the lift 16 is a scissor lift that includes linked, folding supports 24 in a crisscross "X" pattern (known as a pantograph or scissors mechanism) that extends between and are coupled to the base frame 22 and the table 18 to move the table 18 in a generally vertical direction(s) (e.g., upward and/or downward). For example, the upward motion of the table 18 may be achieved by application of pressure to elongate the crisscross pattern, thereby propelling the table 18 upward. The application of pressure can be hydraulic, pneumatic, or mechanical. Depending on the power system employed on the lift 16, it may require no power to lower the table, but rather just the force of gravity and a simple release of hydraulic or pneumatic pressure. Other types of lifts known to those skilled in the art may be used as part of the cradle assembly and lift arrangement 10 instead of a scissor lift.

Figure 7:
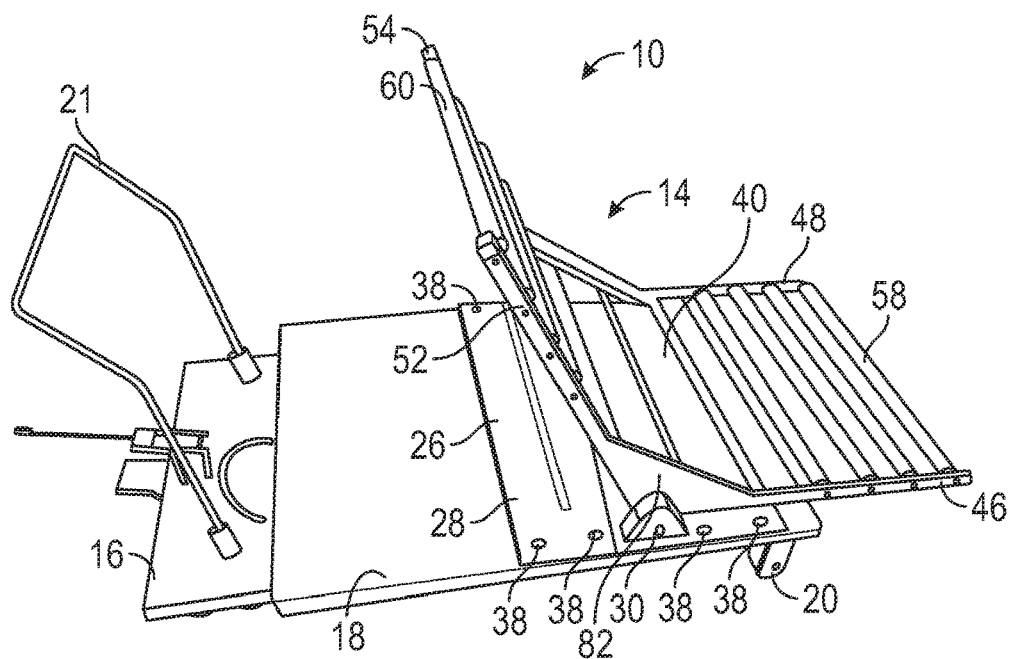
FIG. 7 is a perspective view of a cradle assembly and lift arrangement in the cradle assembly in accordance with an exemplary embodiment.

The cradle assembly 14 is supported on the table 18 of the lift 16. The cradle assembly includes a base 26 that is mounted on the table 18 of the lift 16. The base 26 includes a base plate 28 and pivot rod holders 30 and 32 that extend generally upward from outer edge sections 34 and 36 of the base plate 28. The cradle assembly 14 including the base 26 may be formed primarily of metal such as aluminum or steel in which the pivot rod holders 30 and 32 are welded, for example, to the base plate 28. In an exemplary embodiment and as illustrated in FIG. 7, the base 26 is attached to the table 18 of the lift 16 by fastening elements 38, e.g., threaded fasteners such as bolts retained by nuts, or the like, that extend through the base plate 28 and the table 18 to secure the base plate 28 to the lift 16.

Referring back to FIGS. 1-4, the cradle assembly 14 includes a cradle support subassembly 40 that is pivotably coupled to the base 26 and is configured to support outer sections 42 and 44 of the door 12. In an exemplary embodiment, the cradle support subassembly 40 includes a first pair of arms 46 and 48 that are spaced apart from each other and that extend in a direction (indicated by single headed arrow 50), and a second pair of arms 52 and 54 that are spaced apart from each other and that extend in a direction (indicated by single headed arrow 56). As illustrated, the first pair of arms 46 and 48 and the second pair of arms 52 and 54 extend in different directions 50 and 56 to form a "V-shape" cradle configuration with an angle (indicated by double headed arrow 57) formed between the first pair of arms 46 and 48 and the second pair of arms 52 and 54 for receiving and supporting (e.g., cradling) the outer sections 42 and 44 of the door 12. In an exemplary embodiment, the angle 57 is generally from about 100° to about 150° such as from about 120° to about 140°, for example from about 125° to about 135°.

A first plurality of rollers 58 extend between and are rotationally coupled to the first pair of arms 46 and 48 that support the outer sections 44 of the door 12. Likewise, a second plurality of rollers 60 extend between and are rotationally coupled to the second pair of arms 52 and 54 that support the outer sections 42 of the door 12. As illustrated, each of the rollers of the first plurality of rollers 58 are substantially parallel to and spaced apart from the other rollers 58. Likewise, each of the rollers of the second plurality of rollers 60 are substantially parallel to and spaced apart from the other rollers 60. In an exemplary embodiment, the rollers 58 and 60 each include an elastomeric material (e.g., foam, rubber, or the like) that forms the outer surface of the roller 58 or 60 and that interfaces with the outer sections 42 and 44 of the door 12. Advantageously, the elastomeric material helps prevent scratching of the outer sections 42 and 44 of the door 12 when in contact with the rollers 58 and 60.

Figure 5:
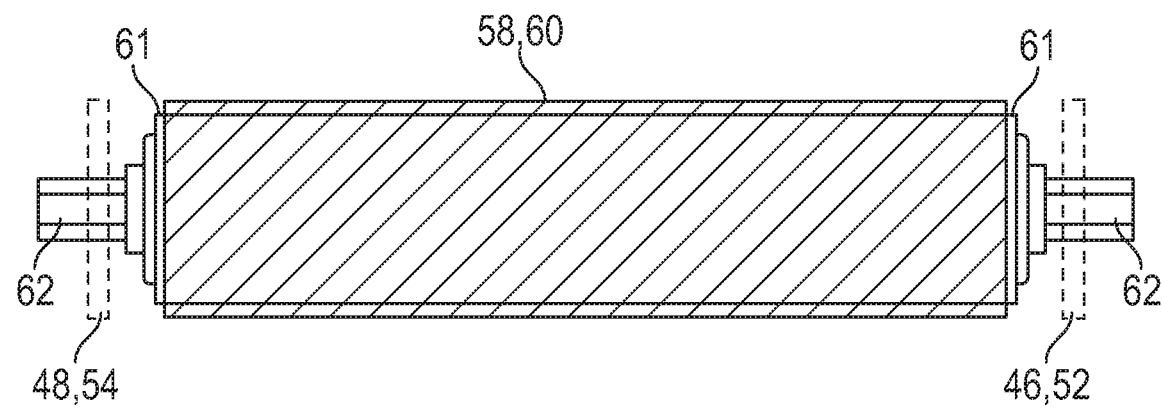
FIG. 5 illustrates a front view of a roller of a cradle assembly in accordance with an exemplary embodiment.
Figure 6:
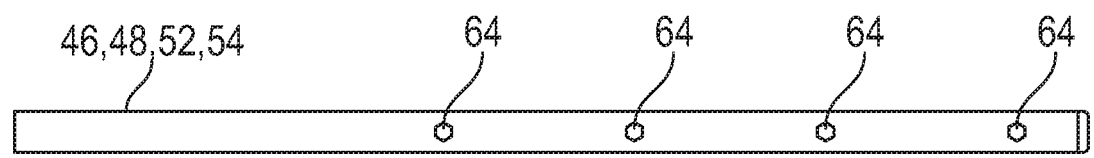
FIG. 6 is a side view of an arm of a cradle assembly in accordance with an exemplary embodiment.

Referring also to FIGS. 5-6, in an exemplary embodiment, each of the rollers 58 and 60 include spring-loaded positive features 62 that interface with internal bearings within the rollers 58 and 60. In one example, the rollers 58 and 60 each include a metal or rigid cylinder 61 that is covered by the elastomeric material. The internal bearings of the rollers 58 and 60 are disposed within the rigid cylinders 61 for allowing the rollers 58 and 60 to independently rotate. Further, one or more spring mechanisms or biasing elements, which are disposed within the rigid cylinders 61 coupled to the internal bearings, cooperate to bias the spring-loaded positive features 62 to extend axially outward in opposing directions from the rigid cylinders 61. In the extended positions, the spring-loaded positive feature 62 are disposed through openings 64 formed in each of the arms 46, 48, 52, and 54 to rotationally couple the rollers 58 and 60 to their corresponding pair of arms 46, 48, 52, and 54. As such and as will be discussed in further detail below, advantageously when the cradle assembly 14 is moved vertically by the lift 16 to advance the door 12 to a partially open or intermediate position, the rollers 58 and 60 are independently free to rotate, allowing the door 12 to self-center or reposition itself within the cradle formed by the pair of arms 46, 48, 52, and 54 and the rollers 58 and 60 to ensure that the door 12 is fully supported by the cradle assembly 14 at all times.

Referring to FIGS. 1-4, in an exemplary embodiment, the cradle support subassembly 40 includes a plurality of braces 66 for supporting the pair of arms 46, 48, 52, and 54 in the "V-shape" cradle configuration. The braces 66 may be welded to each other and/or the pair of arms 46, 48, 52, and 54 to form a welded frame structure for supporting the door 12. As illustrated, the plurality of braces 66 includes braces 68 extending between and coupled to the first pair of arms 46 and 48, and braces 70 extending between and coupled to the second pair of arms 52 and 54. The braces 68 are substantially parallel with the first plurality of rollers 58. Likewise, the braces 70 are substantially parallel with the second plurality of rollers 60. Additionally, the plurality of braces 66 includes cross-braces 72 extending between and coupled to end sections of the braces 68 and 70, and cross-braces 74 extending between and coupled to end sections of the braces 68 and 70. The cross-braces 72 are spaced apart from and substantially parallel to the cross-braces 74.

In an exemplary embodiment, the cradle support subassembly 40 includes a gusseted skin 76 coupled to and at least partially surrounding proximal end sections 78 and 80 of the first and second pair of arms 46, 48, 52, and 54. The arms 46, 48, 52, and 54 extend distally from the proximal end sections 78 and 80 to support the rollers 58 and 60 spaced apart from the gusseted skin 76. As illustrated, the gusseted skin 76 is configured as a "V-shaped" trough that is welded or otherwise attached to the braces 66 and/or the pair of arms 46, 48, 52, and 54 to further reinforce the welded frame structure.

As illustrated, the gusseted skin 76 includes gusseted sidewalls 82 and 84 that are spaced apart from each other and correspondingly adjacent to the pivot rod holders 30 and 32. The gusseted sidewalls 82 and 84 have aligned openings 86 and 88 formed therethrough. In an exemplary embodiment, the cradle assembly 14 includes a rod 90 that pivotally couples the cradle support subassembly 40 to the base 26. In particular, the pivot rod holders 30 and 32 are coupled to opposing end sections of the rod 90 to support the rod 90 above the base plate 28. The rod 90 is disposed through the aligned openings 86 and 88 of the gusseted skin 76 to allow the cradle support subassembly 40 to rotate about the rod 90, pivoting relative to the base 26.

Figure 8:
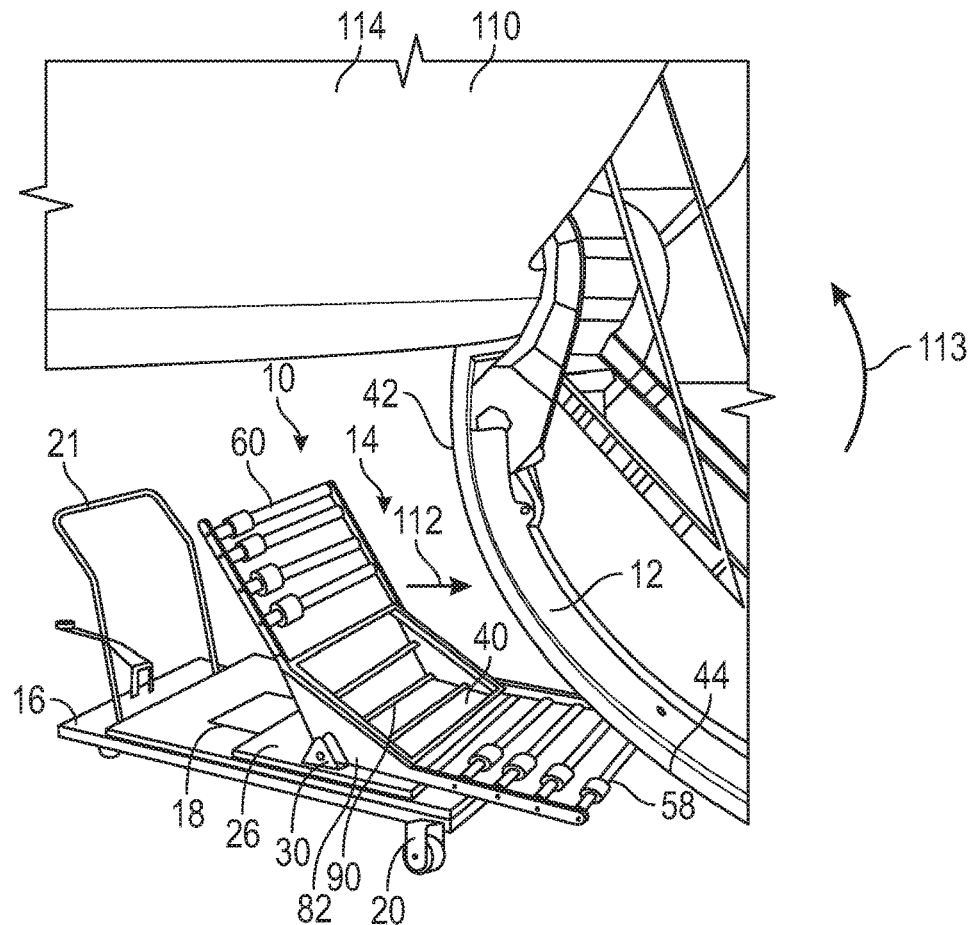
FIG. 8 is a perspective view of a cradle assembly and lift arrangement adjacent to a door that is attached to a fuselage of an aircraft in accordance with an exemplary embodiment.
Figure 10:
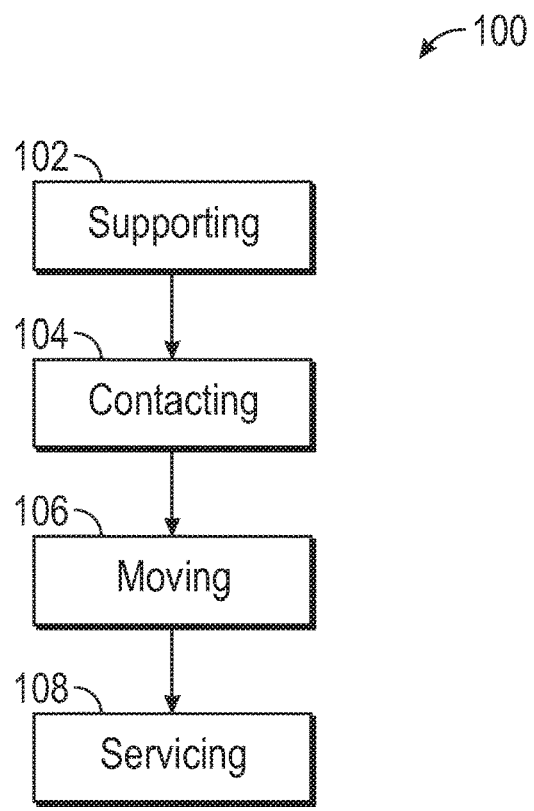
FIG. 10 illustrates a method for supporting a door of an aircraft to facilitate servicing the door in accordance with an exemplary embodiment.

Referring to FIGS. 7-8, and 10, a method 100 for supporting the door 12 of an aircraft 110 to facilitate servicing the door 12 is provided. The method 100 includes supporting (STEP 102) the base 26 of the cradle assembly 14 on the table 18 of the lift 16.

As illustrated, the cradle support subassembly 40 is rotated forward relative to the base 26 in a direction away from the handle 21 of the lift 16 and towards the outer sections 42 and 44 of the door 12, which is shown in a substantially fully open position in FIG. 8. The lift 16 is manually pushed via the handle 21 or otherwise moved in a generally horizontal direction (indicated by single headed arrow 112) along the floor towards the door 12 to scoop-up or otherwise contact (STEP 104) the outer sections 42 and 44 of the door 12 with the cradle support subassembly 40. As illustrated, the door 12 is attached to the fuselage 114 of the aircraft 110 and will rotate about its attachments points to the fuselage 114 when moved in a direction (indicated by single headed arrow 113) towards a partially open or fully closed position.

Figure 9:
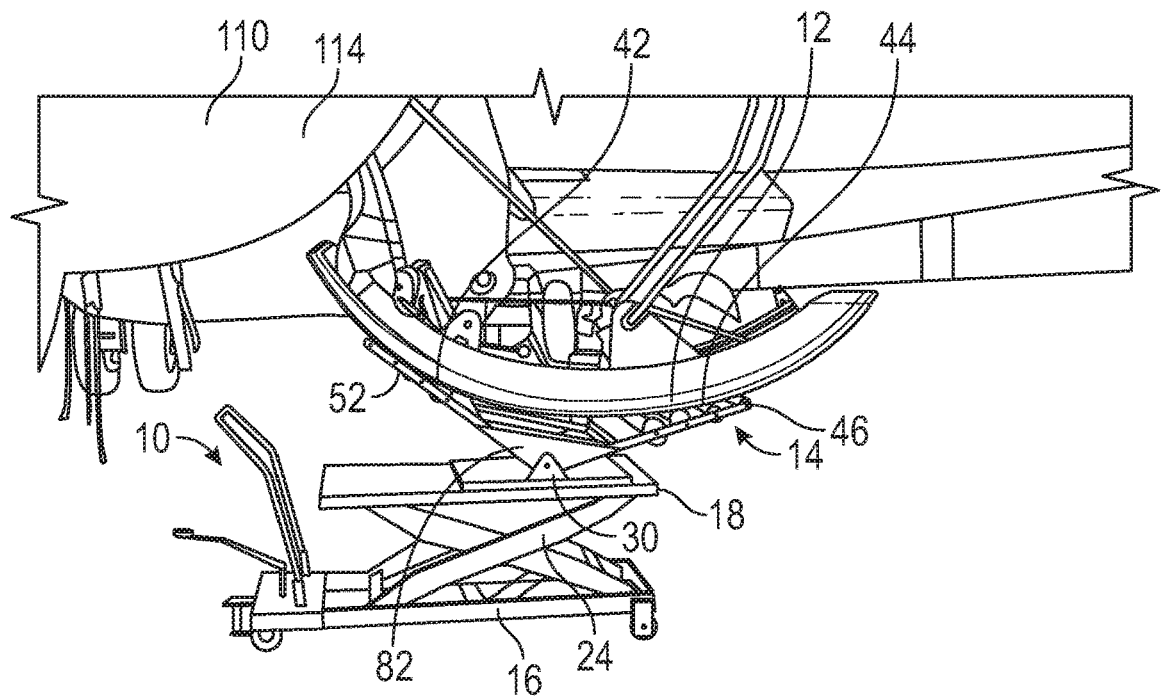
FIG. 9 is a perspective view of a cradle assembly and lift arrangement adjacent supporting a door that is attached to a fuselage of an aircraft for servicing the door in accordance with an exemplary embodiment.

Referring also to FIG. 9, the table 18 of the lift 16 is moved (STEP 106) to advance the cradle assembly 14 vertically and move the door 12 in the direction 113 to a partially open or intermediate position. In an exemplary embodiment, as the door 12 is advanced to the partially open or intermediate position, the door 12 rotates about its attachment points to the fuselage 114 and also self-centers or reposition itself within the cradle support subassembly 40, which pivots relative to the base 26. As illustrated, the door 12 extends in a generally horizontal direction when in the partially open or intermediate position. In an exemplary embodiment, the door 12 is serviced (STEP 108) in the partially open or intermediate position while being supported by the cradle assembly 14. After servicing, the table 18 of the lift 16 may be lowered to remove the cradle assembly 14 from the door 12.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A cradle assembly for supporting a door of an aircraft to facilitate servicing the door, the cradle assembly comprising:
   a base comprising a base plate; and
   a cradle support subassembly pivotably coupled to the base above the base plate and configured to support an outer section of the door, the cradle support subassembly comprising:
   a first pair of arms that are spaced apart from each other and that extend in a first direction;
   a second pair of arms that are spaced apart from each other and that extend in a second direction that is at an angle to the first direction; and
   a gusseted skin coupled to the first and second pair of arms, and wherein the gusseted skin is operatively coupled to the base to allow the cradle support subassembly to pivot relative to the base.

2. The cradle assembly of claim 1, wherein the angle is from about 100° to about 150°.

3. The cradle assembly of claim 1, wherein the cradle support subassembly comprises:
   a first plurality of rollers extending between and rotationally coupled to the first pair of arms; and
   a second plurality of rollers extending between and rotationally coupled to the second pair of arms, and wherein the first and second plurality of rollers are configured to support outer sections of the door.

4. The cradle assembly of claim 3, wherein the first plurality of rollers are substantially parallel to and spaced apart from each other and the second plurality of rollers are substantially parallel to and spaced apart from each other.

5. The cradle assembly of claim 3, wherein each of the first plurality of rollers and the second plurality of rollers comprise an elastomeric material for interfacing with the outer sections of the door.

6. The cradle assembly of claim 3, wherein the cradle support subassembly comprises:
   a first brace extending between and coupled to the first pair of arms; and
   a second brace extending between and coupled to the second pair of arms.

7. The cradle assembly of claim 6, wherein the cradle support subassembly comprises:
   a first cross-brace extending between and coupled to first end sections of the first and second braces; and a second cross-brace extending between and coupled to second end sections of the first and second braces.

8. The cradle assembly of claim 7, wherein the first and second cross-braces are spaced apart from and substantially parallel to each other.

9. The cradle assembly of claim 6, wherein the first brace is substantially parallel with the first plurality of rollers, and the second brace is substantially parallel with the second plurality of rollers.

10. The cradle assembly of claim 1, further comprises a rod, wherein the gusseted skin comprises a first gusseted sidewall and a second gusseted sidewall that are spaced apart from each other and that are operatively coupled to the rod such that the cradle support subassembly rotates about the rod, wherein the base plate has a first section disposed outboard of the first gusseted sidewall and a second section disposed outboard of the second gusseted sidewall, and wherein the base further comprises:
   a first pivot rod holder extending generally upward from the first section of the base plate; and
   a second pivot rod holder extending generally upward from the second section of the base plate, wherein the first and second pivot rod holders are operatively coupled to the rod to support the rod above the base plate and allow the cradle support subassembly to pivot relative to the base above the base plate.

11. A cradle assembly for supporting a door of an aircraft to facilitate servicing the door, the cradle assembly comprising:
   a base; and
   a cradle support subassembly pivotably coupled to the base and configured to support an outer section of the door, wherein the cradle support subassembly comprises:
      a first pair of arms that are spaced apart from each other and that extend in a first direction; and
      a second pair of arms that are spaced apart from each other and that extend in a second direction at an angle to the first direction, wherein the cradle support subassembly comprises:
      a first plurality of rollers extending between and rotationally coupled to the first pair of arms; and
      a second plurality of rollers extending between and rotationally coupled to the second pair of arms, wherein the first and second plurality of rollers are configured to support outer sections of the door, and wherein the cradle support subassembly comprises:
      a gusseted skin coupled to and at least partially surrounding proximal end sections of the first and second pair of arms, and wherein the first and second plurality of rollers are disposed distally from the gusseted skin.

12. The cradle assembly of claim 11, further comprising a rod that pivotally couples the cradle support subassembly to the base.

13. The cradle assembly of claim 12, wherein the gusseted skin comprises a first gusseted sidewall and a second gusseted sidewall that is spaced apart from the first gusseted sidewall, and wherein the first and second gusseted sidewalls are operatively coupled to the rod such that the cradle support subassembly rotates about the rod.

14. The cradle assembly of claim 13, wherein the base comprises:
   a base plate having a first section disposed outboard of the first gusseted sidewall and a second section disposed outboard of the second gusseted sidewall;
   a first pivot rod holder extending generally upward from the first section of the base plate; and
   a second pivot rod holder extending generally upward from the second section of the base plate, wherein the first and second pivot rod holders are operatively coupled to the rod to support the rod above the base plate and allow the cradle support subassembly to pivot relative to the base.

* * * * *